# 2,873,262

NOVEL ALKYD RESINS PREPARED FROM INDANDICARBOXYLIC ACIDS AND THE PROCESS OF PREPARING THE SAME

John C. Petropoulos, Norwalk, Conn., assignor to American Cyanamid Company, New York, N. Y., a corporation of Maine No Drawing. Application October 10, 1955
Serial No. 539,646

15 Claims. (Cl. 260—22)

This invention relates to a new class of alkyd resins and to the process of preparing the same. More particularly, this invention relates to the process for preparing alkyd resins comprising reacting a polyhydric alcohol with a polycarboxylic acid having the general formula:

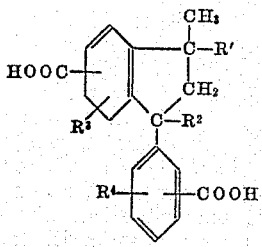

wherein $R'$ and $R^2$ are members selected from the group consisting of alkyl groups containing from 1 to 4 carbon atoms, and halo groups and $R^3$ and $R^4$ are members selected from the group consisting of hydrogen, alkyl groups containing from 1 to 4 carbon atoms and halo groups.

Still further, this invention relates to the process of preparing glyceride oil modified alkyd resins of the same class.

One of the objects of the present invention is to produce a novel class of alkyd resins. A further object of the present invention is to produce a class of alkyd resins which have marked superiority over conventional and commercially available alkyd resins. These and other objects of the present invention will be discussed in greater detail hereinbelow.

This application is a continuation of my copending application having the Serial No. 414,860, filed March 8, 1954, entitled "Novel Compositions of Matter and Processes of Preparing Same," now abandoned.

The novel alkyd resins of the present invention are prepared by reacting a polyhydric alcohol with the dicarboxylic acids which result from the oxidation of the dimers of alkyl side chain substituted styrenes and halo side chain substituted styrenes wherein said styrenes have a methyl group substituted on the ring. The alkyl group in the alpha position may be any one of methyl, ethyl, propyl, and butyl. The propyl group may be either n-propyl or isopropyl and the butyl group may be either n-butyl, isobutyl or tertiary butyl. The methyl group on the ring may be in either the ortho, meta or para position. Representative of the class of alkyl substituted styrenes which may be used in the practice of the process of the present invention are α,o-dimethylstyrene, α,m-dimethylstyrene, α,p-dimethylstyrene, α-ethyl, o-methylstyrene, α-ethyl, m-methylstyrene, α-ethyl, p-methylstyrene, α-propyl, o-methylstyrene, α-propyl, m-methylstyrene, α-propyl, p-methylstyrene, α-butyl, o-methylstyrene, α-butyl, m-methylstyrene, α-butyl, p-methylstyrene and the like. In the place of the alkyl groups containing between 1 and 4 carbon atoms which may be substituted on the side chain in the α position, one may utilize the halo substituents such as the chloro, bromo, iodo and fluoro. Representative of this class of compounds are α-chloro, m-methylstyrene, α-bromo, p-methylstyrene, α-iodo, o-methylstyrene, α-fluoro, p-methylstyrene and the like. The methyl substituent on the ring may be the sole substituent on the ring or it may be accompanied by other substituents such as other alkyl groups, halo groups, such as those mentioned hereinabove, and the like. In order that the process for the preparation of the dimers utilized in the practice of the process of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as indicated in the appended claims.

DIMERIZATION OF α,p-DIMETHYLSTYRENE 800 parts of toluene cooled to 5° C. are introduced into a suitable reaction vessel. To the toluene, there is added 140 parts of a 95% sulfuric acid. The mixture is stirred thoroughly and maintained at a temperature of about 0–5° C. To the cooled mixture, there is added 260 parts of α,p-dimethylstyrene dissolved in 200 parts of toluene. The resulting mixture is allowed to react for ½ hour at 0–5° C. and is then hydrolyzed with 120 parts of water. The organic layer is washed free of acidic material with water and is distilled to yield 250 parts of a colorless oil having a boiling point of 142–144° C. at 0.8 mm. This oil solidifies and has a melting point of 37–38° C. uncorrected. The product produced is 1-(4-methylphenyl)-1,3,3,6-tetramethyl-indan.

DIMERIZATION OF α-ETHYL, p-METHYLSTYRENE

To 400 parts of toluene at 5° C., there is added slowly 70 parts of 95% sulfuric acid followed by 144 parts of α-ethyl, p-methylstyrene dissolved in 100 parts of toluene. The temperature is maintained at 0–10° C. during the entire addition. The resulting mixture is allowed to react for ½ hour and then is hydrolyzed with 100 parts of water. The organic material is collected, washed free of acidic material with water and distilled to yield 130 parts of a colorless liquid having a boiling point of 160–165° C. at 1 mm. The product produced is 1-(4-methylphenyl)-1,3-diethyl-3,6-dimethyl-indan.

DIMERIZATION OF α, META-DIMETHYLSTYRENE

To 200 parts of toluene at 0–5° C., there is added slowly 35 parts of 95% sulfuric acid, 65 parts of α,m-dimethylstyrene dissolved in 50 parts of toluene. The resulting mixture is allowed to react for about ½ hour and is then hydrolyzed with water. The organic material is collected, washed and distilled to yield 61 parts of a colorless liquid having a boiling point of 144–148° C. at 1 mm. pressure. The product produced is 1-(3-methylphenyl)-1,3,3,5-tetramethyl-indan.

DIMERIZATION OF CRUDE α,p-DIMETHYLSTYRENE

To 368 parts of toluene at 10° C., there is added slowly 50 parts of anhydrous aluminum chloride followed by 516 parts of crude (undistilled) α,p-dimethylstyrene dissolved in 368 parts of toluene while maintaining the temperature below 10° C. After a 20 minute reaction time, the mixture is hydrolyzed with water and the organic layer is collected and dried. The organic material is distilled to give 150 parts of a colorless oil having a boiling point of 138–140° C. at 0.5–1 mm.

DIMERIZATION OF α,p-DIMETHYLSTYRENE

A mixture of 310 parts of freshly distilled α,p-dimethylstyrene and 2 parts of p-toluene sulfonic acid are heated in a steam bath for about 16 hours and then allowed to react at room temperature for 2½ months, at which time the p-toluene sulfonic acid catalyst is removed by washing the organic layer with dilute sodium bicarbonate solution. Distillation of the organic layer gave 151 parts of a very light yellow colored oil having a boiling point of 136–140° C. at 1 mm. pressure.

PROCESS FOR THE PREPARATION OF 1-(4-CARBOXYPHENYL) - 1,3,3 - TRIMETHYL-6-INDAN-CARBOXYLIC ACID

Into a suitable reaction vessel equipped with thermometer, stirrer and reflux condenser, there is introduced 34 parts of the dimer of α,p-dimethylstyrene, 57 parts of concentrated nitric acid and 80 parts of water and the mixture is refluxed for 48 hours. The yield, amounting to about 32 parts, was a light tan solid. This product is collected and washed free of acid with water. 10 parts of this product is dissolved in 150 parts of 1 N sodium hydroxide and there is added thereto 10 parts of potassium permanganate and the resulting mixture is allowed to reflux for ½ hour. The mixture is acidified and then treated with sodium sulfite, in order to reduce the manganese dioxide to manganese sulfate. This gave a yield of 11 parts of a light tan solid which after recrystallization from acetic acid became colorless and had a neutral equivalent of 162 and a melting point of 293–4° C., uncorrected. *Analysis.*—Calculated for $C_{20}H_{20}O_4$; C, 74.05; H, 6.22; COOH, 27.79. Found: C, 73.83; H, 6.23; COOH, 27.73.

ALTERNATIVE METHOD FOR THE PREPARATION OF 1 - (4-CARBOXYPHENYL)-1,3,3-TRIMETHYL-6-INDAN-CARBOXYLIC ACID

Into an autoclave, there is introduced 26.4 parts of the dimer of α,p-dimethylstyrene, 66.2 parts of concentrated nitric acid and 61 parts of water and the mixture is heated slowly in the autoclave. At 150° C., an exothermic reaction develops and the temperature and pressure increased to 190° C. and 1000 p. s. i., respectively. After about 10 minutes at 190° C., the autoclave is cooled and the product amounting to about 26 parts (80% yield), is collected. The resulting product is a light tan solid having a melting point of 278–285° C. and had a neutral equivalent of 164. When this product is recrystallized from acetic acid, the colored nitration product impurities are substantially completely removed and the melting point is raised to 293–294° C.

PREPARATION OF 1 - (4 - CARBOXYPHENYL)-1,3-DIETHYL - 3 - METHYL-6-INDAN-CARBOXYLIC ACID

A mixture of 14.6 parts of the dimer of α-ethyl,p-methylstyrene, 23 parts of concentrated nitric acid (specific gravity 1.42) and 30 parts of water is heated slowly in an autoclave until a temperature of 190–195° C. is reached. The reaction mixture is held at this temperature for 14 minutes and then allowed to cool to room temperature. The product, a light tan solid, having a neutral equivalent of 175–180, is collected in approximately 75–80% yield. The product thus produced may be further purified by recrystallization from glacial acetic acid or methyl isobutyl ketone.

PREPARATION OF 1-(3-CARBOXYPHENYL)-1,3,3-TRIMETHYL-5-INDAN-CARBOXYLIC ACID

A mixture of 13 parts of the dimer α,m-dimethylstyrene, 23 parts of concentrated nitric acid (specific gravity 1.42) and 30 parts of water are heated slowly in an autoclave until a temperature of about 190–195° C. is reached. The reaction mixture is held at this temperature for about 15 minutes and then allowed to cool to room temperature. The product, a light tan solid having a neutral equivalent of about 160–164 is collected in an approximate yield of 78–84%. Again this product may be further purified by recrystallization as in the preceding example, to give a colorless solid of melting point 210–212° C., uncorrected.

The dicarboxylic acids produced in accordance with the process of the present invention will find use in a plurality of different applications but principally these dicarboxylic acids will be found to be useful in the production of alkyd resins by coreacting said acids with conventional polyhydric alcohols. Amongst the polyhydric alcohols which may be used to form alkyd resins by reacting with the novel dicarboxylic acids of the present invention are ethylene glycol, diethylene glycol, trimethylene glycol, tetramethylene glycol, glycerol, trimethylol propane; 2,2-dimethylpropanediol-1,3; trimethylol ethane; 2-ethyl-2-butyl-propanediol-1,3; pentaerythritol, dipentaerythritol, sorbitol, pinacol, arabitol, xylitol, adonitol, mannitol and the alkane diols such as butanediol-1,3; butanediol-1,4; pentanediol-1,5; hexanediol-1,6 and the like. These polyhydric alcohols may be used either singly or in combination with one another. The alkyd resins of the present invention may be either oil free or oil modified. If they are to be oil modified, the dicarboxylic acids of the present invention may be esterified with glycerol in the presence of saturated and unsaturated oils such as coconut oil, palm oil, safflower oil, rape seed oil, peanut oil, corn oil, cottonseed oil, soya oil, linseed oil, perilla oil, castor oil, talloil, oitica oil, sardine oil, tung oil, whale oil and the like and saturated fatty acids such as lauric, stearic, palmitic and the like.

Additionally, the alkyd resins of the present invention may be modified by copolymerization with compounds containing a polymerizable $CH_2=C<$ group, such as styrene, α-methylstyrene, α-ethylstyrene, α-chlorostyrene, and ring substituted styrenes such as the o, m, p-alkylstyrenes such as the o-methylstyrene, m-ethylstyrene, p-propylstyrene and the like or the disubstituted styrenes such as the 2,4-dimethylstyrene, the 2,5-diethylstyrene, the 3,4-dipropylstyrene and the like, or the ring substituted mono and dihalo styrenes such as o, m, or p-chlorostyrenes, or the 2,4-dichlorostyrene or the 2,5-dibromostyrene and the like or the alkyl acrylates, methacrylates and acrylonitrile. When the alkyd resins of the present invention are to be modified by reaction with a compound containing a polymerizable $CH_2=C<$ group, it is generally desired that the alkyd resin be modified with an oil or the fatty acids derived therefrom. These oils may be either the non-drying, semi-drying or drying oils. Preferably, these oils or fatty acids derived therefrom when modifying the alkyd resin should contain some measure of unsaturation in order to permit interpolymerization between the unsaturated group in the vinyl or vinylidene compound with the unsaturated double bond in the fatty acid chain. This lends to greater compatibility between the homopolymer which may be present and the vinyl or vinylidene monomer modified oil alkyd resin.

In addition to the use of the dicarboxylic acids of the present invention in the manufacture of alkyd resins, one may make use of such other polycarboxylic acids as those which are free of non-benzenoid unsaturation, e. g., phthalic, oxalic, malonic, succinic, glutaric, sebacic, adipic, pimelic, suberic, azelic, tricarballylic, citric, tartaric, malic and the like. Additionally, if it is desired to make use of unsaturated polycarboxylic acids, one may make use of unsaturated polycarboxylic acids one may make use of such acids as maleic, fumaric, aconitic, itaconic and the like. Obviously, these acids may be utilized in combination with one another conjunctively with the dicarboxylic acids of the present invention in the formation of alkyd resins. Still further, the anhydrides of these acids whenever available or mixtures of these anhydrides may be utilized with the novel dicarboxylic acids of the present invention in the preparation of alkyd resins or mixtures of the anhydrides with the mixtures of the above-identified acids may be utilized with the novel dicarboxylic acids of the present invention in the preparation of these novel alkyd resins.

A further utilization of the dicarboxylic acids of the present invention will be in the preparation of alkyl esters which will be utilized in the manufacture of alkyd resins by the process known as ester-interchange. These alkyl esters of the novel dicarboxylic acids of the present invention will find further utilization as plasticizers for resinous materials.

*Example 1*

50 parts of 1-(4-carboxyphenyl)-1,3,3-trimethyl-6-indan carboxylic acid are dissolved in 600 parts of methanol, and the solution is saturated with dry hydrochloric acid. The resulting solution is allowed to react at room temperature for about 48 hours. The excess methanol is stripped off and the concentrate is poured into ice water whereupon an amorphous solid is precipitated out. This solid is dissolved in ether and washed with dilute sodium bicarbonate solution. The removal of the ether gave a 48 part yield (88%) of a white crystalline solid having a melting point of 97–98° C., uncorrected.

*Example 2*

A mixture of 32.4 parts of 1-(4-carboxyphenyl)-1,3,3-trimethyl-6-indan carboxylic acid, 188 parts of butanol, 20 parts of xylol and 0.3 part of p-toluene sulfonic acid are refluxed for 20 hours, during which time the water of esterification is removed azeotropically. After the excess butanol and xylol are removed by distillation, the residue is dissolved and washed free of acid materials with dilute sodium bicarbonate. The evaporation of the ether solution gave an oily residue, which after distillation produced 35 parts (81%) yield of a pale yellow viscous oil having a boiling point of 259–260° C. at 0.5 mm.

*Example 3*

A mixture of 25 parts of 1-(4-carboxyphenyl)-1,3,3-trimethyl-6-indan-carboxylic acid and 75 parts of 2-ethyl hexanol is refluxed at a temperature of 185–200° C. and the water of esterification is removed azeotropically. The excess alcohol is stripped off under vacuum leaving a dark viscous residue having an acid number of 15. This residue is dissolved in dry ether, and is passed over an activated alumina column which removes substantially all of the acidic material and substantially all of the colored impurities. The evaporation of the ether therefrom, afforded 29 parts (70% yield) of a light yellow very viscous oil of an acid number less than 1.

*Example 4*

Into a suitable reaction vessel equiped with agitator, thermometer, inert gas inlet, and reflux condenser, there is introduced 29.2 parts of 1-(4-carboxyphenyl)-1,3,3-trimethyl-6-indan-carboxylic acid, 20.1 parts of refined soya fatty acids, and 11.2 parts of glycerin. The reactants are heated to 230–235° C. until esterification is substantially complete. The product thus produced has an acid number of 10 and is soluble in xylol and contains 36% fatty acid modifier.

*Example 5*

A conventional alkyd resin is prepared by reacting phthalic anhydride with 20.1 parts of refined soya fatty acids and 11.2 parts of glycerin to give an alkyd resin containing 36% fatty acid modifier. The reactants were treated as in Example 4.

*Example 6*

29.2 parts of 1-(4-carboxyphenyl)-1,3,3-trimethyl-6-indan-carboxylic acid, 23 parts of refined soya fatty acids, and 10.8 parts of glycerin were reacted as in Example 8 to a final acid number of 10.5, a viscosity of $Z_3$ on the Gardner-Holdt scale at 25° C., based on a 60% solids solution in xylol. This alkyd resin contained 40% of the fatty acid modifier.

A comparison of clear film properties of the alkyd resins of Examples 4, 5 and 6 indicated that Examples 4 and 6 air dried much faster than Example 5 and had markedly better resistance to water, alkali and acetic acid.

White baking enamels are prepared from the resins of Examples 4, 5, and 6 at a pigment:resin ratio of 0.7:1, where the pigment was $TiO_2$. The resin solids are 75% of an alkyd resin prepared according to Examples 4, 5 or 6 and 25% solids of a butylated melamine-formaldehyde resin. These resins are cast on steel and are baked for 20 minutes at 300° C. A comparison of the film properties is indicated hereinbelow.

| Modified Resins of Examples | 4 | 5 | 6 |
|---|---|---|---|
| Gloss | Excellent | Good | Excellent. |
| 5% Alkali Resistance (Hrs. to Fail) | 50–70 | 2–5 | 50–70. |
| 50% Acetic Acid Resistance (minutes to fail) | 50 | 5 | 30. |

*Example 7*

4.3 parts of 1-(4-carboxyphenyl)-1,3,3-trimethyl-6-indan-carboxylic acid, 1.37 parts of lauric acid and 1.56 parts of glycerin are reacted together as in Example 5 to a final acid value of 5.0. The resulting resin is soluble in xylol and contains 20% fatty acid modifier.

*Example 8*

4 parts of 1-(4-carboxyphenyl)-1,3,3-trimethyl-6-indan-carboxylic acid, 2.47 parts of lauric acid and 1.4 parts of glycerin are reacted together as in the preceding example to a final acid value of 11.5. The resulting resin is soluble in xylol and contains 34.5% fatty acid modifier.

*Example 9*

A commercially available lauric acid modified phthalic alkyd having outstanding resistance to heat and chemical reagents and containing 30% fatty acid modifier is used as a control. Each of the alkyd resins prepared according to Examples 7, 8 and 9 are blended with a butanol-modified benzoguanamine-formaldehyde resin at an 80/20 ratio where 80 parts are alkyd resins and 20 parts are benzoguanamine resin. Films of these blends were drawn on a thin steel panel and baked for 30 minutes at 300° F. and 20 minutes at 400° F. A comparison of film properties is outlined hereinbelow wherein the comparative ratings indicate 10—best, and 0—poorest:

| | 7 | 8 | 9 |
|---|---|---|---|
| Color Retention | 10 | 5 | 6 |
| 5% Alkali Resistance | 5 | 10 | 0 |
| 50% Acetic Acid Resistance | 10 | 5 | 0 |

*Example 10*

5 parts of 1-(4-carboxyphenyl)1,3,3-trimethyl-6-indan-carboxylic acid and 2.18 parts of a 98% glycerol are introduced into a suitable reaction vessel equipped as in Example 4 and are reacted at 240° C. until an acid number of 10 is reached. The resulting resinous material was soluble in a mixture of butanol and xylol 1/1 and had a viscosity of V on the Gardner-Holdt scale at 25° C. in a 40% solids solution.

*Example 11*

5.67 parts of 1-(4-carboxyphenyl)-1,3,3-trimethyl-6- indan-carboxylic acid and 2.74 parts of a 98% glycerol are reacted in a suitable reaction vessel equipped as in Example 4 at a temperature of 240° C. until an acid number of 1.0 is reached. The resulting resin is soluble in a 1/1 mixture of butanol and xylol and had a viscosity of V on the Gardner-Holdt scale at 25° C. when measured on a 50% solids solution.

The resins prepared according to Examples 10 and 11 were combined separately with a butanol modified benzoguanamine-formaldehyde resin in 80/20 proportions alkyd resin to benzoguanamine resin, respectively, and films drawn down from each of these resinous mixtures and baked for 30 minutes at 300° F. to produce a clear film. When compared with a conventional saturated fatty acid modified phthalic alkyd resin, the resins of Examples 10 and 11 were markedly superior in color retention and acid resistance.

It is known that conventional phthalic anhydride glycerol alkyd resins which contain no fatty acid modifier are not ordinarily compatible with amino resins such as the butylated melamine-formaldehyde resins, the butanol-modified urea-formaldehyde resins, the butanol modified benzoguanamine formaldehyde resins and the like. Additionally, when these conventional phthalic glyceride resins containing no fatty acid modifier are utilized to form films, it is often observed that the films will have certain irregularities in their surface structure such as craters and pinholes. The alkyd resins prepared according to Examples 10 and 11 when used alone form films which are free from the above-mentioned irregularities.

*Example 12*

4 parts of 1-(4-carboxyphenyl)-1,3,3-trimethyl-6-indancarboxylic acid and 0.8 part of ethylene glycol are heated in a suitable reaction vessel equipped as in Example 4 until esterification is substantially complete. The resin thus prepared had an acid number of 17–8 and a softening point of 165° C.

*Example 13*

Into a suitable reaction vessel equipped as in Example 4, there is introduced 22.8 parts of 1-(4-carboxyphenyl)-1,3,3-trimethyl-6-indan-carboxylic acid, 19.1 parts of soya oil fatty acids and 8.2 parts of 98% glycerol. The charge is heated gradually up to about 220° C. and maintained at 220–230° C. until an acid number of 2.5 is realized. The resultant alkyd resin when cut to 65% solids in xylol had a viscosity of V–W on the Gardner-Holdt scale at 25° C. The color was 9-Gardner 1933. This alkyd resin would be considered a short oxidizing type and contained 41.5% fatty acids.

*Example 14*

Into a suitable reaction vessel equipped as before, there is introduced 22.8 parts of 1-(3-carboxyphenyl)-1,3,3-trimethyl-5-indan-carboxylic acid, 19.1 parts of soya oil fatty acids and 7.8 parts of 98% glycerol. The charge is heated gradually up to 225° C. and maintained at 225–235° C. until an acid number of 7.3 is reached. When cut to 70% solids in xylol, the resin solution had a viscosity of X on the Gardner-Holdt scale at 25° C. and a color of 4-Gardner 1933.

*Example 15*

Into a suitable reaction vessel equipped as before, there is introduced 55 parts of a mixture of dibasic acids which are the oxidation products of dimers derived from approximately equal parts of am-dimethyl styrene and α,p-dimethyl styrene, 47.5 parts of soya fatty acids and 19.5 parts of 98% glycerol. The charge is heated gradually to about 225° C. and maintained at 225–235° C. until an acid number of 7.0 is reached. When cut in xylol to 65% resin solids, the solution had a viscosity of X on the Gardner-Holdt scale at 25° C. and a color of 4–5, Gardner 1933.

The properties of air dried films produced from the resins of Examples 13, 14 and 15 were compared with a similar type of soya oil fatty acid modified o-phthalate alkyd resin. The results are shown in the following table:

| Example | Tack-free Time, hours | Caustic Resistance | Acetic Acid Resistance | Impact Resistance | Hardness | Gloss Retention | Gasoline Resistance |
|---|---|---|---|---|---|---|---|
| 13 | 2 | 1 | 1 | 2 | 1 | 1 | 1 |
| 14 | 2–3 | 1 | 1 | 2 | 1 | 1 | 2 |
| 15 | 2–3 | 1 | 1 | 3 | 1 | 1 | 2 |
| o-Phthalic resin | 6–8 | 4 | 4 | 2 | 3 | 4 | 1 |

1=excellent; 2=good; 3=fair-good; 4=fair.

*Example 16*

Into a suitable reaction vessel equipped as before, there is introduced 320 parts of 1-(4-carboxyphenyl)-1,3,3-trimethyl-6-indan-carboxylic acid, 197 parts of coconut oil fatty acids and 110 parts of 98% glycerol. The charge is heated to about 220° C. and held at a temperature of 220–230° C. until an acid number of 8.0 is reached. When cut in xylol to a 60% solids solution, the viscosity was Z on the Gardner-Holdt scale at 25° C. and had a color of 3-Gardner 1933. Tests on baked white enamels containing as the vehicle a combination of two parts of alkyd resin to one of a butylated melamine-formaldehyde resin gave the following comparative results when the resin of this example was compared with a comparative alkyd resin prepared from o-phthalic acid and from meta-phthalic acid. The results are shown in the following table.

| Resin | NaOH Resistance | Acetic Resistance | [1] Color Retention | [1] Gloss Retention | Resistance to Detergent Solution |
|---|---|---|---|---|---|
| Ex. 16 | 1 | 2 | 1 | 1 | 1 |
| o-phthalic | 3 | 3 | 2 | 3 | 3 |
| m-phthalic | 2 | 3 | 2 | 3 | 3 |

[1] Retention characteristics as measured by high temperature over baking.
1=excellent; 2=good; 3=fair.

*Example 17*

Into a suitable reaction vessel equipped as before, there is introduced 320 parts of 1-(4-carboxyphenyl)-1,3,3-trimethyl-6-indan-carboxylic acid, 289 parts of soya fatty acids and 116.5 parts of 98% glycerol. The charge is heated gradually to 230° C. and maintained at 210–230° C. until an acid number of 4.8 is reached. The resultant resin was cut with xylol to form a 65% solids solution, which had a viscosity of $Z_2$ on the Gardner-Holdt scale at 25° C. and a color of 4—Gardner 1933.

*Example 18*

Into a suitable reaction vessel equipped as before, there is introduced 310 parts of 1-(4-carboxyphenyl)-1,3,3-trimethyl-6-indan-carboxylic acid, 240 parts of soya fatty acids, 63 parts of China-wood oil and 110 parts of 98% glycerol. The charge is heated gradually to about 220° C. and maintained at 220–230° C. until an acid number of 6.6 is reached. The resultant resin is cut with Varsol #1 (a high boiling aliphatic petroleum hydrocarbon of low kauri-butanol value) to form a solution having a viscosity of $Z_2$ on the Gardner-Holdt scale at 25° C. The resinous material produced is classed as a medium oil oxidizing type of alkyd resin and contained 45% of oil acids. Air dried films were drawn down from the resin thus produced and from a comparable medium oil length phthalic alkyd resin. A comparison of these air dried films was made and the results of said comparison are set forth in the following chart:

| Resin | Tack-free Time, hours | Gloss | NaOH Reance | Acetic Reance | Hardness |
|---|---|---|---|---|---|
| Ex. 18 | 2 | Good | Excellent | Excellent | Excellent. |
| o-phthalic | 7 | ---do--- | Fair | Good | Good. |

Example 19

Into a suitable reaction vessel equipped as before, there is introduced 310 parts of 1-(4-carboxyphenyl)-1,3,3-trimethyl-6-indan-carboxylic acid, 700 parts of soya fatty acids, and 168 parts of pentaerythritol. The charge is heated gradually to 240° C. and held at a temperature between 240° and 260° C. until an acid number of 2.0 is reached. The resultant resin is cut with Varsol #1 to a 70% solids solution which had a viscosity of $Z_4$-$Z_5$ on the Gardner-Holdt scale at 25° C. and the color was 4+—Gardner 1933. The resin solution thus produced would be classed as a long oil architectural resin and contained 64% fatty acids.

Example 20

Into a suitable reaction vessel equipped as before, there is introduced 70 parts of the dimethyl ester of 1 - (4 - carboxyphenyl) - 1,3,3 - trimethyl - 6 - indan-carboxylic acid, 17 parts of pentaerythritol, 12.7 parts of methyl cocoate (the methyl ester of the fatty acids of coconut oil), and 0.28 part of a lead octoate solution containing 24% lead. The charge is heated gradually to about 200° C. and held at 200–220° C. until thickening begins to occur but short of the gel point indicating that the desired transesterification point has been reached. The resultant resin is cut with xylol to a 60% solids solution having a viscosity of $Z_1$ on the Gardner-Holdt scale at 25° C. and a color of 4—Gardner 1933.

Amongst the dicarboxylic acids, which may be used to prepare the novel alkyd resins of the present invention are: 1 - (4 - carboxyphenyl) - 1,3,3, - trimethyl - 6-indan - carboxylic acid; 1 - (3 - carboxyphenyl) - 1,3,3-trimethyl - 5 - indan - carboxylic acid; 1 - (2 - carboxyphenyl) - 1,3,3 - trimethyl - 4 - indan - carboxylic acid; 1 - (4 - carboxyphenyl) - 1,3 - diethyl - 3 - methyl - 6-indan - carboxylic acid; 1 - (3 - carboxyphenyl) - 1,3-diethyl - 3 - methyl - 5 - indan - carboxylic acid; 1 - (2-carboxyphenyl) - 1,3 - diethyl - 3 - methyl - 4 -indan-carboxylic acid; 1 - (4 - carboxyphenyl) - 1,3 - dipropyl-3 - methyl - 6 - indan - carboxylic acid; 1 - (4 - carboxyphenyl) - 1,3 - dibutyl - 3 - methyl - 6 - indan - carboxylic acid; 1 - (4 - carboxyphenyl) - 1,3 - dichloro - 3 - methyl-6 - indan - carboxylic acid; 1 - (4 - carboxyphenyl) - 1,3-diiodo - 3 - methyl - 6 - indan - carboxylic acid; 1 - (4-carboxyphenyl) - 1,3 - dibromo - 3 - methyl - 6 - indan-carboxylic acid; 1 - (4 - carboxyphenyl) - 1,3 - difluoro-3 - methyl - 6 -indan - carboxylic acid; 1 - (3 - methyl-4-carboxyphenyl) - 1,3,3,5 - tetramethyl - 6 - indan-carboxylic acid; 1 - (4 - methyl - 3 - carboxyphenyl)-1,3,6 - tetramethyl - 5 - indan - carboxylic acid; 1-(3 - methyl - 4 - carboxyphenyl) - 1,3 - diethyl - 3,5-dimethyl - 6 -indan - carboxylic acid; 1 - (3 - methyl-4 - carboxyphenyl) - 1,3-dipropyl - 3,5 - dimethyl - 6-indan - carboxylic acid; 1 - (3 - methyl - 4 - carboxyphenyl) - 1,3 - dibutyl - 3,5 - dimethyl - 6 - indan - carboxylic acid; 1 - (3 - methyl - 4 - carboxyphenyl) - 1,3,-dichloro - 3,5 - dimethyl - 6 - indan - carboxylic acid; 1 - (3 - ethyl - 4 - carboxyphenyl) - 1,3,5 - triethyl - 3-methyl - 6 - indan - carboxylic acid; 1 - (3 - propyl - 4-carboxyphenyl) - 1,3,5 - tripropyl - 3 - methyl - 6 - indan-carboxylic acid; 1 - (3 - butyl - 4 - carboxyphenyl)-1,3,5 - tributyl -3 - methyl - 6 - indan-carboxylic acid; 1 - (3 - chloro - 4 - carboxyphenyl) - 1,3,5 - trichloro-3 - methyl - 6 indan - carboxylic acid; 1 - (4 - ethyl - 3 - carboxyphenyl) - 1,3,6 - triethyl - 3 - methyl - 5-indan - carboxylic acid; 1 - (4 - propyl - 3 - carboxyphenyl) - 1,3,6 - tripropyl - 3 - methyl - 5 - indan - carboxylic acid; 1 - (4 - butyl - 3 - carboxyphenyl) - 1,3,6-tributyl - 3 - methyl - 5 - indan - carboxylic acid; 1 - (4-chloro - 3 - carboxyphenyl) - 1,3,6 - trichloro - 3 - methyl-5 - indan - carboxylic acid, and the like.

In the preparation of the dicarboxylic acids used in the present invention, one oxidizes the dimer of a compound having the general formula:

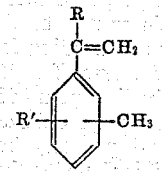

wherein R is an alkyl radical having between 1 and 4 carbon atoms, namely methyl, ethyl, propyl, butyl or a halo group such as chloro, bromo, iodo, and fluoro, and R' is H, an alkyl radical having between 1 and 4 carbon atoms or a halo group. Preferably, the alkyl side chain substituted monomer is used to form the dimer. The dimers thus formed are oxidized to form the acids used in the present invention. The acids produced in the course of oxidation have the general formula:

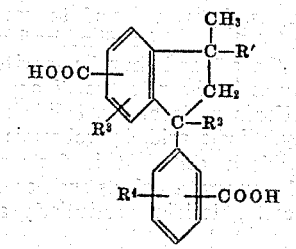

wherein R and $R^2$ are members selected from the group consisting of alkyl groups containing from 1 to 4 carbon atoms, and halo groups and $R^3$ and $R^4$ are members selected from the group consisting of hydrogen, alkyl groups containing from 1 to 4 carbon atoms and halo groups.

In the oxidation of the dimers utilized in the process of the present invention, one may utilize temperatures varying from about room temperature to about the boiling point of the dimer. It is preferred, however, to utilize temperatures greater than about 100° C. as the temperature significantly below that temperature will cause the oxidation reaction to proceed slowly. The oxidization reaction may be carried out in the presence of any of the well known oxidizing reagents such as chromic acid in glacial acetic acid, potassium permanganate, in the presence of an alkali, potassium dichromate in the presence of a strong acid such as sulfuric acid or the oxidization can be simply carried out by blowing air or oxygen through the batch. The oxidization further could be carried out in the presence of heavy metal catalyst such as the metal salts of the organic acids such as the cobalt, lead, iron, nickel, manganese, magnesium and the like, salts of acetic acid, propionic acid, oleic acid, stearic acid, rosin acids, naphthenic acid and the like. The oxidization can be carried out either at atmospheric pressure or super atmospheric pressure such as at about 3 or 4 atmospheres. The oxidization may be carried out either in the liquid phase or in the vapor phase. In the vapor phase the dimer would be vaporized and in being boiled off would be passed over a fixed bed of catalyst of the vanadium type. In the vapor phase, there is a possibility of closer control of the contact time, temperature, and the separation of the oxidized material from the unoxidized in a recycling operation. In the oxidization reaction, it is generally desirable to stop the conversion at about 30–40% of the calculated yield in order to avoid side reactions and other complications. The oxidization reaction being stopped at just such a point would permit the separation of the dicarboxylic acids thus produced and the recyclization of the dimer. The lower limit on the reaction temperature of the oxidization reaction is generally considered to be above the melting point of the particular dimer selected for oxidization. Still lower temperatures can be utilized if the oxidization is carried out with the dimer dispersed or dissolved in a solvent medium. The utilization of the solvent medium, however, may well effect the upper limit at which the oxidization reaction can be carried out inasmuch as the boiling point of the solvent will be the controlling factor in the oxidization temperature. Of course, if super atmospheric pressure is utilized, the boiling point of the solvent is not a necessary limitation on the oxidization reaction. The solvent medium should properly be a material which cannot readily be oxidized under the oxidization conditions of the reaction. Otherwise, complications of mixed end products will be presented. In addition to oxidization in a solvent medium, dispersions and emulsions may be utilized as the medium for oxidization.

In the preparation of the dimers used in the present invention, one may use temperatures varying between about −20° C. and about 300° C. In order to prevent possible decompositions, however, it is preferred to keep the temperature below about 250° C. In the lower temperatures, it is preferred to use a range of between 0° and 10° C. The dimerization reaction is well known in the art and may be carried out at the lower temperatures in the presence of any strong acids such as the sulfonic acids or the halide acids such as fluoric acids, hydroiodic acid, hydrobromic acid, or anhydrous hydrochloric acid. It is further possible to utilize activated clay-type catalysts such as diatomaceous earth, fuller's earth, floridin, particularly at the higher temperatures.

In addition to the production of these dicarboxylic acids by the oxidization of the dimers of compounds such as α,p-dimethylstyrene, it is possible to react the dimers as described in detail hereinabove in a plurality of different ways. It is possible to produce the derivatives of the dimers set forth hereinabove, wherein a substituent is introduced into one or more of the aromatic rings in any of the available positions. These substituents may be —NO₂, —OH, —NH₂, —NHC—CH₃, —NHC—CH=CH₂
                            ‖          ‖
                            O          O —C≡N, —NHC—NH₂, N=C=O, —SO₃H, —SO₂NH₂, —X(halo)
        ‖
        O —O-alkyl, —O-aryl, —OCH₂CH₂OH, OCH₂—CH—CH₃
                                      |
                                      OH

—OCH₂—CH——CH₂, —OCH₂—CH=CH₂, COOH, —CONH
         \\O/

The dimers may be converted to a substituted dimer containing the —NO₂ group by reaction with nitric acid. This substituted dimer may be reduced wherein the —NO₂ substituent becomes a —NH₂ group and can be further converted by reacting with an acid such as hydrochloric in the presence of a cyanate such as potassium cyanate to convert the —NH₂ substituent to the

—NHC—NH₂
 ‖
 O

The substituted dimer containing the substituent —NH₂ can be further reacted with acetic anhydride or acetyl chloride to yield a dimer having the substituent

—NHC—CH₃
 ‖
 O in the place of the —NH₂ group. The substituted dimer containing the —NH₂ could be reacted with acrylyl chloride to convert the —NH₂ group to a

—NHC—CH=CH₂
 ‖
 O

The substituted dimer containing the —NH₂ group could be reacted with phosgene to convert the —NH₂ group to the —NCO group. The substituted dimer containing the —NH₂ group can be reacted with nitrous acid and cuprous cyanide to yield in the place of the —NH₂ group a —C≡N group. The nitrile substituent thus produced can be hydrolyzed in the presence of an acid wherein the —C≡N group is converted to the —C—NH₂ group
 ‖
 O The amide substituted dimers may be further hydrolyzed in the presence of acids or bases to yield in the place of the —C—NH₂ group
 ‖
 O a —COOH group. The acid substituted dimers thus produced can be reacted with an aliphatic mono or polyhydric alcohol or an aromatic mono or polyhydric alcohol to give corresponding esters, wherein the —COOH group is converted to a —COOR group where R is an alkyl or an aryl residue. The dimers per se may further be reacted with sulfuric acid in a sulfonation reaction to incorporate into the dimers rings a —SO₃H group. The dimers containing the —SO₃H groups may be reacted with NH₃ to give —SO₂NH₂ groups in place of the —SO₃H groups. The dimers containing the substituent —SO₃H group may be reacted with alkali to convert the —SO₃H group to a —OH group. These phenol substituted dimers may be converted to an alkali metal salt thereof such as the sodium salt and then reacted with an alkyl or an aryl halide to give an alkyl or an aryl ether such as —OR, wherein the R represents an alkyl or an aryl group. The substituted dimers containing the —OH group may be reacted with ethylene oxide or propylene oxide and the like to give as substituents in the place of the —OH, a —OCH₂CH₂OH or —OCH₂CHOHCH₃ group and the like. The substituted dimer containing the group —OH may be reacted with an epihalohydrin such as epichloro to yield in the place of the —OH group, the group

—OCH₂CHCH₂
      \\O/

The substituted dimer containing the —OH group may be reacted with an allyl halide to give a substituted dimer in which there is substituted in the place of the —OH group the group —OCH₂CH=CH₂ group. The dimers per se may be reacted with a halogen to substitute said dimer on its ring with an —X group wherein the X is a halo group such as chloro, bromo, fluoro or iodo. These substituents can be incorporated into the ring or rings of the dimer as described in detail hereinabove and where the reaction conditions or the reactants do not conflict with one another, a plurality or a mixture of these substituents can be incorporated into the ring or rings of the dimers. By increasing the ratio of reactant to dimer, it is possible to incorporate a plurality of these substituents into each of the rings of the dimers. These substituted dimers will find application in a plurality of fields. Certain of them, such as those containing nitrogen groups having a reactive hydrogen thereon, may be reacted with an aldehyde such as formaldehyde to form potential condensation products. Others containing unsaturated double bonds may be utilized in a polymerization reaction, wherein the double bonds open up to form linear polymers and the like.

In the preparation of the novel alkyds of the present invention, one may react these indan carboxylic acids with polyhydric alcohols such as are enumerated hereinabove in conventional amounts. Ordinarily, one would use an excess of polyhydric alcohol, amounting to about 5 or 10% over and beyond the stoichiometrically calculated amount required to produce substantially complete esterification. The acid number of the alkyd resin may vary considerably, depending on the ultimate end use but for most purposes an acid number below 100 is desired and preferably one below about 40.

These alkyd resins may be utilized alone or in combination with aminoplast resins such as the aldehyde reaction product of hydrogen reactive amino compounds such as urea, thiourea, dicyandiamide, and aminotriazines such as melamine, formoguanamine, acetoguanamine, benzoguanamine and the like. Although many aldehydes can be used in the preparation of these aminoplast resins such as acetaldehyde, benzaldehyde, acrolein, furfural and the like, formaldehyde is the preferred aldehyde. These aminoplast resins may be alcohol modified or unmodified but generally it is preferred to use the alcohol modified variety. As modifying alcohols, one may use any of the monohydric aliphatic alcohols such as methanol, ethanol, propanol, and butanol. Because of its organic solvent soluble properties, the butanol modified resin is generally preferred.

In the preparation of alkyd resins generally in keeping with the concepts of the present invention, one may make a preformed alkyd resin by reacting these indan carboxylic acids and a polyhydric alcohol with or without a glyceride oil and then react with a polymerizable monomer such as styrene or, if one wishes to make use of the monoglyceride approach, the resulting resins would be highly satisfactory. A still further approach to the production of these novel alkyd resins would reside in the reaction of the glyceride oil with the polymerizable monomer such as styrene and after polymerization is substantially complete introducing the polyhydric alcohol alone or in combination with these indan carboxylic acids and heat reacting to substantially complete esterification.

If it is desired to produce alkyd resins which have fire resistant or fire retardant properties, one will elect to use those indan carboxylic acids which are halogenated. The halogenation may be present in the 1,3 positions or it may be nuclear halogenation. The presence of chloro groups are particularly advantageous for this purpose. These halo groups may be present in the initial monomeric material prior to dimerization, if desired, or unhalogenated monomers may be dimerized, oxidized and then halogenated prior to reaction with the polyhydric alcohol to form the alkyd resins of the present invention. As an alternative, the unhalogenated monomer may be dimerized, halogenated and then oxidized to form the indan carboxylic acid desired.

I claim:

1. A process for the preparation of an alkyd resin comprising reacting a polyhydric alcohol with a compound having the general formula:

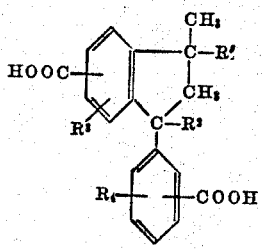

wherein $R'$ and $R^2$ are members selected from the group consisting of alkyl groups containing from 1 to 4 carbon atoms, and halo groups and $R^3$ and $R^4$ are members selected from the group consisting of hydrogen, alkyl groups containing from 1 to 4 carbon atoms and halo groups.

2. A process for the preparation of an alkyd resin comprising reacting a polyhydric alcohol with 1-(4-carboxyphenyl)-1,3,3-trimethyl-6-indan-carboxylic acid.

3. A process for the preparation of an alkyd resin comprising reacting a polyhydric alcohol with 1-(3-carboxyphenyl)-1,3,3-trimethyl-5-indan-carboxylic acid.

4. A process for the preparation of an alkyd resin comprising reacting a polyhydric alcohol with 1-(4-carboxyphenyl)1,3-diethyl-3-methyl-6-indan-carboxylic acid.

5. An alkyd resin prepared by reacting a polyhydric alcohol with a compound having the general formula:

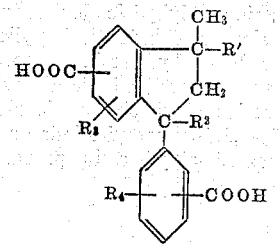

wherein $R'$ and $R^2$ are members selected from the group consisting of alkyl groups containing from 1 to 4 carbon atoms, and halo groups and $R^3$ and $R^4$ are members selected from the group consisting of hydrogen, alkyl groups containing from 1 to 4 carbon atoms and halo groups.

6. An alkyd resin prepared by reacting a polyhydric alcohol with 1-(4-carboxyphenyl)-1,3,3-trimethyl-6-indan-carboxylic acid.

7. A process for preparing an oil modified alkyd resin comprising reacting a glyceride oil, a polyhydric alcohol and an acid having the general formula:

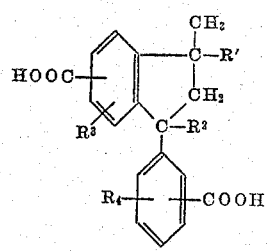

wherein $R'$ and $R^2$ are members selected from the group consisting of alkyl groups containing 1 to 4 carbon atoms and halo groups and $R_3$ and $R_4$ are members selected from the group consisting of hydrogen, alkyl groups containing from 1 to 4 carbon atoms and halo groups.

8. A process for preparing an oil modified alkyd resin comprising reacting a glyceride oil, a polyhydric alcohol and 1-(4-carboxyphenyl)-1,3,3-trimethyl-6-indan-carboxylic acid.

9. An oil modified alkyd resin prepared by reacting a glyceride oil, a polyhydric alcohol and an acid having the general formula:

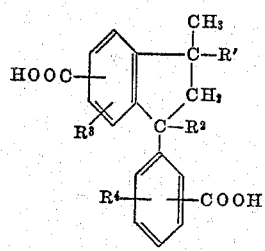

wherein $R'$ and $R^2$ are members selected from the group consisting of alkyl groups containing 1 to 4 carbon atoms and halo groups.

10. An oil modified alkyd resin prepared by reacting a glyceride oil, a polyhydric alcohol and 1-(4-carboxyphenyl)-1,3,3-trimethyl-6-indan-carboxylic acid.

11. An oil modified alkyd resin prepared by reacting a glyceride oil, a polyhydric alcohol and 1-(3-carboxyphenyl)-1,3,3-trimethyl-5-indan-carboxylic acid.

12. A vinyl monomer modified alkyd resin prepared by reacting a polymerizable compound containing a $CH_2=C<$ group with an oil modified alkyd resin prepared by reacting a glyceride oil, a polyhydric alcohol and 1-(4-carboxyphenyl)-1,3,3-trimethyl-6-indan-carboxylic acid.

13. A vinyl monomer modified alkyd resin prepared by reacting a polymerizable compound containing a $$CH_2=C<$$

group with an oil modified alkyd resin prepared by reacting a glyceride oil, a polyhydric alcohol and 1-(3-carboxyphenyl)-1,3,3-trimethyl-5-indan-carboxylic acid.

14. A styrenated alkyd resin prepared by reacting styrene with an oil modified alkyd resin prepared by reacting a glyceride oil, a polyhydric alcohol and 1-(4-carboxyphenyl)-1,3,3-trimethyl-6-indan-carboxylic acid.

15. A styrenated alkyd resin prepared by reacting styrene with an oil modified alkyd resin prepared by reacting a glyceride oil, a polyhydric alcohol and 1-(3-carboxyphenyl)-1,3,3-trimethyl-5-indan-carboxylic acid.

References Cited in the file of this patent

UNITED STATES PATENTS

| | | |
|---|---|---|
| 2,629,751 | Wiggins | Feb. 24, 1953 |
| 2,646,450 | Thurber | July 21, 1953 |
| 2,748,092 | Daniels et al. | May 29, 1956 |

FOREIGN PATENTS

| | | |
|---|---|---|
| 1,017,881 | France | Oct. 1, 1952 |

OTHER REFERENCES

Hoenel: Paint, Oil and Chem. Review, June 4, 1931, pages 19 and 25. (Copy in Scientific Library.)

Beilstein: First Supplement, volume 9, page 417, 1932.

UNITED STATES PATENT OFFICE
Certificate of Correction

Patent No. 2,873,262                          February 10, 1959

John C. Petropoulos

It is hereby certified that error appears in the printed specification of the above numbered patent requiring correction and that the said Letters Patent should read as corrected below.

Column 4, line 35, for "allyd" read —alkyd—; column 6, line 50, after "drawn" insert —down—; column 7, line 68, for "αm-dimethyl styrene" read —α,m-dimethyl styrene—; column 11, line 50, third substituent from the left, for "N=C=O" read — —N=C=O—; line 55, last substituent on said line, for "-CONH" read — -CONH₂—; column 13, lines 58 to 67 should appear as shown below instead of as in the patent—

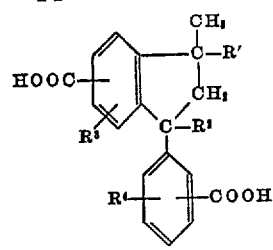

Signed and sealed this 16th day of June 1959.

[SEAL]

Attest:
KARL H. AXLINE,
*Attesting Officer.*

ROBERT C. WATSON,
*Commissioner of Patents.*